(12) United States Patent
Fairly et al.

(10) Patent No.: US 8,111,447 B2
(45) Date of Patent: Feb. 7, 2012

(54) ELECTRONIC DEVICE BASED ON ELECTROWETTING EFFECT

(75) Inventors: Peter Douglas Fairly, Plymouth (GB); Steven Charles Deane, Redhill (GB); Carl Glasse, Redhill (GB)

(73) Assignee: Samsung LCD Netherlands R&D Center B.V., Eindhoven (NL)

( * ) Notice: Subject to any disclaimer, the term of this patent is extended or adjusted under 35 U.S.C. 154(b) by 75 days.

(21) Appl. No.: 12/438,742

(22) PCT Filed: Aug. 29, 2007

(86) PCT No.: PCT/IB2007/053482
§ 371 (c)(1),
(2), (4) Date: Feb. 25, 2009

(87) PCT Pub. No.: WO2008/026179
PCT Pub. Date: Mar. 6, 2008

(65) Prior Publication Data
US 2009/0316253 A1    Dec. 24, 2009

(30) Foreign Application Priority Data

Aug. 31, 2006   (EP) ..................... 06119905

(51) Int. Cl.
*G02B 26/00*    (2006.01)

(52) U.S. Cl. ....................... 359/296; 359/666

(58) Field of Classification Search ............ 359/296, 359/245, 253, 666; 345/32, 41, 96
See application file for complete search history.

(56) References Cited

U.S. PATENT DOCUMENTS

| | | | |
|---|---|---|---|
| 7,359,108 B2 * | 4/2008 | Hayes et al. ............... | 359/296 |
| 7,561,131 B2 * | 7/2009 | Ijzerman et al. ........... | 345/87 |
| 7,569,129 B2 * | 8/2009 | Pamula et al. ............. | 204/450 |
| 2003/0012483 A1 | 1/2003 | Ticknor et al. | |
| 2004/0263947 A1 | 12/2004 | Drzaic | |

FOREIGN PATENT DOCUMENTS

EP    1271218 A1    1/2003
(Continued)

OTHER PUBLICATIONS

Feenstra B J et al: "Electrowetting-Based Displays: Bringing Microfluidics Alive On-Screen" Micro Electro Mechanical Systems, 2006. MEMS 2006 Istanbul. 19th IEEE International Conference on Instanbul, Turkey Jan. 22-26, 2006, Piscataway, NJ, USA,IEEE, Jan. 22, 2006, pp. 48-53, XP010914522 ISBN: 0-7803-9475-5.

*Primary Examiner* — Xiaoliang Chen
*Assistant Examiner* — Nathan Milakovich
(74) *Attorney, Agent, or Firm* — H.C. Park & Associates, PLC (57) ABSTRACT

An electronic device comprises an array of electro wetting cells, each cell comprising first and second liquids (14,18) which are immiscible in each other. An electrode arrangement (60a,60b) is used to control the position of the interface between the first and second liquids, and comprises a first electrode and a second electrode. Each cell comprises a first switching device (64a) for applying a cell drive voltage to the first electrode (60a), and a second switching device (64b) for simultaneously applying the same cell drive voltage to the second electrode (60b). The cell circuit can be produced without requiring any additional control lines to those required for a single electrode and associated switching device, but the use of two switching devices enables the ultimate signal applied to each electrode to be different as a result of different capacitive effects. This then enables control over the way the liquid interface moves in response to control voltages.

16 Claims, 10 Drawing Sheets

FOREIGN PATENT DOCUMENTS

| | | |
|---|---|---|
| EP | 1400834 A1 | 3/2004 |
| WO | 2001007961 A1 | 2/2001 |
| WO | 03071346 A1 | 8/2003 |
| WO | 2004077124 A1 | 9/2004 |
| WO | 2004104671 A1 | 12/2004 |
| WO | 2006017129 A2 | 2/2006 |

* cited by examiner

ELECTRONIC DEVICE BASED ON ELECTROWETTING EFFECT

This invention relates to electronic devices which use the electrowetting effect. This relates to the electrical control of electrostatic forces to provide control over the optical characteristics of a body of fluid. Display devices and controllable lenses have been proposed which use the electrowetting effect.

Figure 1:
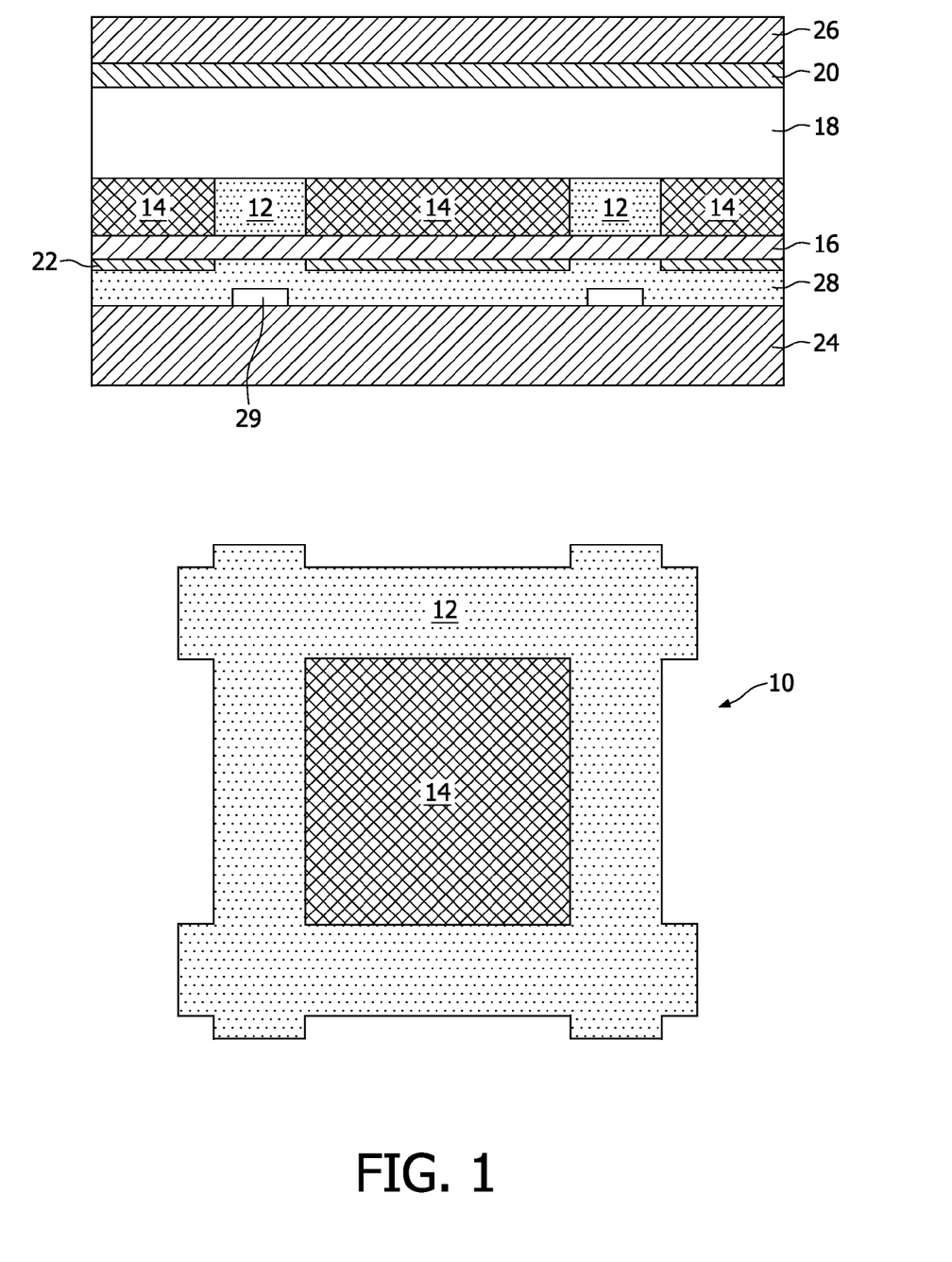
FIG. 1 shows a known display pixel of an electrowetting display in cross section and in plan view, and in a first display state.

A known electrowetting display device comprises an array of cells, each of which is filled with a layer of coloured oil. FIG. 1 shows one cell 10 in cross section (top image) and in plan view (bottom image). Each cell 10 forms a pixel in the display, and is separated from its neighbour by cell walls 12 which contain a coloured oil 14 of the cell.

The cell walls are in the form of a grid which is attached to a hydrophobic insulating layer 16 which forms the base of the cell. Above the cells is a layer of conductive water 18, which is common to all cells. Electrical contact is made to the conductive water via a transparent common electrode 20. Within each cell is a separate pixel electrode 22 which permits application of a voltage individually to the base of each cell.

The conductive water 18 is in practice a polar conductive salt solution and the oil is an insulating silicone oil or an alkane, and is coloured with a dye or pigment. The two liquids are immiscible.

The display cells are provided between a lower substrate 24 and a glass top plate 26. An insulating passivation layer 28 is provided between the substrate 24 and the pixel electrodes 22. The cells each have a control TFT contained within the passivation layer 28, and these TFTs form an Active Matrix array. Row and column electrodes are also provided, which enable connection to the integrated circuit drivers. Column electrodes are shown as 29 in FIG. 1.

In the absence of any external applied voltage, the oil spreads out over the hydrophobic insulating layer 16 at the base of a pixel cell, and this defines what is termed the 'closed' state, in which both the optical reflectivity and transmission through a cell are low.

When a voltage of sufficient magnitude is applied between the pixel electrode 22 of a particular cell and the common electrode 20, the oil recedes to one edge or corner of the cell, bulging up in the vertical direction alongside the cell wall. Specifically, the application of an external electric field across a cell adjusts the energy balance of the water-oil-hydrophobic insulator system, making it favourable for the water to be in contact with the hydrophobic insulator as opposed to the oil.

Figure 2:
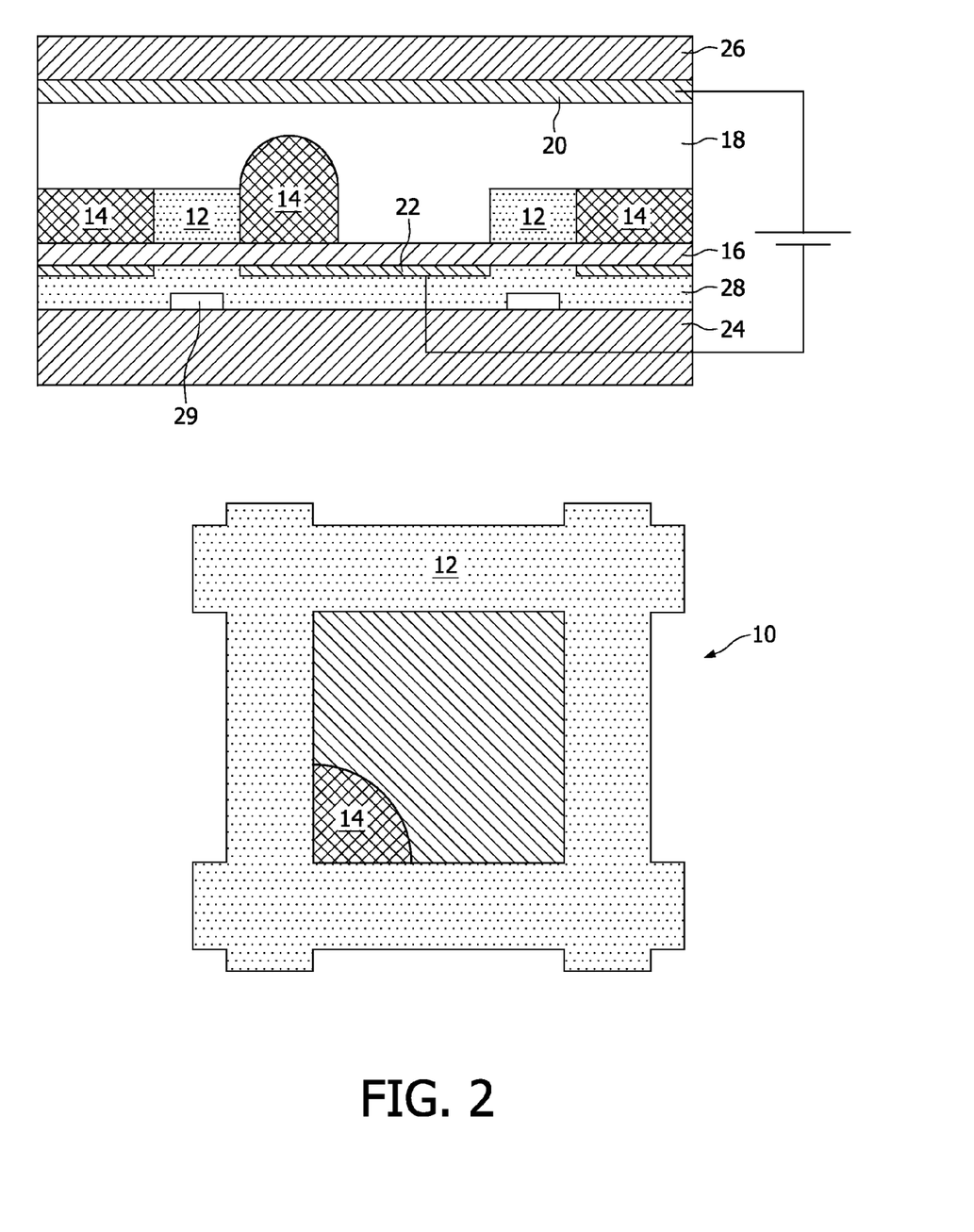
FIG. 2 shows the known display pixel of FIG. 1 in a second display state.

FIG. 1 shows the closed state of the cell, and FIG. 2 shows the open state of the same cell.

When the water is brought into contact with the hydrophobic layer, the oil is displaced as shown in FIG. 2, typically to a corner of the cell area. In existing systems there is, however, no control over which corner of the cell the oil moves to when in the 'open' state of FIG. 2.

It would be desirable to be able to control this for two reasons. The first problem arises when large regions of the display are driven to a uniform state of greyscale opening, such as for example the uniform background in the display of information-based images. In existing displays, whilst many of the cells in an electrowetting display appear in practice to open with the oil moving to one particular corner, this is not always the same corner each time the cell opens, and not the same corner for different regions of the display. It is well known that the eye is particularly sensitive to brightness variations that exist along a straight line. Pixels within blocks of some tens of pixels are often seen to open to the same corner, but the observer's eye is particularly sensitive to the straight-line interfaces between these smaller blocks within the uniform background. These straight-line interfaces therefore appear as display artefacts and are irritating to the eye and degrade the perceived display quality.

Secondly, and with equal importance, one of the attractive features justifying the use of electrowetting displays is that, because they operate with so-called subtractive (Cyan, Magenta, Yellow) dyes in the oil, they enable a high brightness, high efficiency colour display. The use of subtractive colour filtering enables a high brightness white display output, by having all pixels in the open state. The use of patterned colour filters (as used with LCD displays) to define different pixels of different colours instead enables a white image to be displayed with only approximately ⅓ light efficiency.

A colour display using subtractive colour filtering has been proposed in the form of a stacked display, with three separate layers of different colour dyes in each of the three layers, one on top of another. In theory, with perfect subtractive colours (flat transmission band and vertical stop-band edges) the resultant colour does not depend on which corner of the cell the oil moves to. However, in practice the stop-band edges are non-vertical, they overlap, and the colours will not be spectrally pure. This leads to colour shifts depending on which colours physically overlap.

For example, if a display is driven to a uniform red colour, it will be seen as having variations in colour across the display. This is unlikely to be acceptable to the viewer.

Additionally, at close range the eye may also resolve the different colours in each pixel, and this will lead to a rainbow-type effect at the edges of the oil. Therefore, a reproducible colour gamut for a particular cell, and across an array, can only be achieved by ensuring that the oil in each one of the three layers opens to the same corner in each colour-layer.

For example, assume a stacked pixel is illuminated with white light with power $P_0$ over the entire pixel area, and voltages are applied to each of three cyan, magenta and yellow stacked cells to open each cell. The aim is to provide the brightest white output, and the oil is for example receded into ⅓ of the total aperture.

If the oil positions all overlap, the cyan, magenta and yellow components would be directly on top of each other. Since the combined effect of the three subtractive dyes is black, the result is ⅓ of the cell is black and ⅔ of the cell is white and the cell's transmitted power will be ⅔ $P_0$, and greyish-white when spatially averaged by the eye.

In another situation, the cyan and the magenta could be on top of each other in one third of the aperture, the yellow could be in a separate third and white would be in the remaining third. The subtractive colour filtering of cyan on top of magenta gives blue at a power of $P_0/3$ from one third of the cell aperture. This adds to the yellow at power $P_0/3$ to give White at power $P_0/3$. This adds to the white at $P_0/3$ to give ⅔ $P_0$ greyish-white. This means the correct overall output is obtained, but this is for a perfectly spectrally matched cyan, magenta and yellow dyes, and the results will be different for practical dyes in which the transmission spectra will overlap and have non-vertical edges.

Therefore the only route to accurate colour reproducibility with a stacked array system must include control over where the oil opens to within a cell. This invention relates to this issue.

One possible mechanism conceived by the applicant (for example eluded to in WO 03/071346) for producing control over the pixel opening shape could involve a means of locally increasing the electric field within a pixel, since it is the electric field that is causing the oil to recede. By doing this, the oil can be steered into a particular corner of the cell. This type of control could for example be implemented by locally (within a cell) reducing the thickness of the hydrophobic insulator, so that when a voltage is applied across a cell there will be a region of slightly higher electric field, and so that the cell has a tendency to open in that region first.

By making a region close to the three edges of a typically square pixel cell with slightly thinner dielectric insulator, this will indeed tend to cause the cell to open with the oil collecting at the fourth edge where the dielectric is thicker. However, this approach has the practical drawback that the pixel electrode metal layer within a cell must be made non-planar over a large step height. This introduces an extra processing step and requires more complicated cell making processes, in order to contour the dielectric insulator in order to avoid step-coverage issues. This approach also results in a non-planar hydrophobic layer, which also complicates the patterning of subsequent stages, such as the cell walls. Additionally, the presence of a different optical path length within a cell may introduce optical interference effects and degrade the perceived image quality.

Another approach conceived by the applicant (and not published) that could be used to control the opening of the cells is to remove a region (such as a corner) from the pixel electrode. The lower electric field in this region of the cell should cause the oil to recede into this corner. However, this means there is absence of control of the electric field in the electrode-free region, and simulations have shown that this approach may not give repeatable results.

According to the invention, there is provided an electronic device comprising an array of cells, each cell comprising:

first and second liquids which are immiscible in each other;
a hydrophobic layer;
an electrode arrangement for applying a control voltage to the hydrophobic layer for controlling the position of the interface between the first and second liquids, wherein the electrode arrangement comprises a first electrode and a second electrode, and
wherein each cell comprises a first switching device for applying a cell drive voltage to the first electrode, and a second switching device for simultaneously applying the same cell drive voltage to the second electrode.

The cell design of the invention provides two electrode areas for each cell, and which are controlled by the same voltages, but each with their own respective switching devices. This means the cell circuit can be produced without requiring any additional control lines to those required for a single electrode and associated switching device, but the use of two switching devices enables the ultimate signal applied to each electrode to be different as a result of different capacitive effects.

These different signals then enable the hydrophobic layer to be controlled differently by the two electrodes, and this can be used to control the way in which the liquid interface moves in response to an applied voltage.

This invention thus provides a simple method which can ensure that the liquid interface repeatably moves to the same corner of a cell each time it is driven open.

The device of the invention requires no additional processing steps for manufacture, and no process development.

Preferably, a kickback voltage, introduced at the end of the addressing using the switching devices, is different for the two switching devices of each cell. In this way, the invention utilises the well-understood effect of 'kickback' which is usually considered a problem in active matrix displays.

In the cell of the device of the invention, one TFT-pixel electrode combination can be primarily used to open the cell to the desired opening with a net voltage (V1). The other can have a net voltage V2 where |V2|>|V1| and can then be used to both open the cell as well as to steer one of the liquids away from this higher field region, thereby forcing the liquid into a particular corner (over V1) when it opens.

Each cell preferably further comprises a first storage capacitance between the first electrode and a capacitor electrode, and a second storage capacitance between the second electrode and the capacitor electrode.

A different kickback voltage can then be obtained either by providing different switching devices or by providing different storage capacitances.

For example, the ratio of a parasitic capacitance of the first switching device to the first storage capacitance is preferably different to the ratio of the corresponding parasitic capacitance of the second switching device to the second storage capacitance.

Each switching device may comprise a thin film transistor, and the parasitic capacitance can then comprise the source-drain capacitance.

The different kickback voltages can be obtained by designing each transistor to have substantially the same source-drain capacitance and the first storage capacitance is designed to be different to the second storage capacitance. This storage capacitance difference can be obtained by providing the first electrode with a first area and the second electrode with a second, greater area.

In one example, the cell has a substantially quadrilateral shape, bounded by cell walls, and the first electrode comprises an outer electrode which borders three of the four sides of the quadrilateral, and the second electrode comprises an inner electrode which borders two adjacent sides of the quadrilateral at a corner location. Using this design, the liquid interface can be reliably directed to one chosen corner of the cell.

The first and second electrodes are preferably co-planar. The pixel electrode region of the device can thus use planar layers, and this means that the subsequent processes are not affected by the implementation of the invention. For example, standard add-on techniques such as the use of Internal Diffuse Reflectors, are still applicable.

The device can comprise a display device, and wherein each cell comprises a display pixel.

With reflective displays the alteration in pixel design has no impact on brightness. With transmissive pixel designs there will be a slight reduction in the modulated pixel area and hence brightness because two TFTs are required within a pixel as opposed to one in the current art. This slight disadvantage can be offset by the fact that a smaller TFT is required to drive a smaller pixel load capacitance so that the loss in area is not significant.

Each cell can comprise a clear liquid and a coloured liquid, the coloured liquid providing subtractive colour filtering. The display can thus be arranged as a stack of three display devices, one having cells with a magenta coloured liquid, one having cells with a cyan coloured liquid and one having cells with a yellow coloured liquid.

The invention also provides a method of operating an electronic device comprising an array of cells, each cell comprising first and second liquids which are immiscible in each other and a hydrophobic layer, the method comprising, for each cell:

applying a cell drive voltage to the hydrophobic layer for controlling the position of the interface between the first and second liquids using first and second electrodes, the same drive voltage being applied to the first and second electrodes simultaneously through respective switching devices.

Examples of the invention will now be described in detail with reference to the accompanying drawings, in which.

The invention relates to an electronic device comprising an array of electrowetting cells, in which each cell has a first electrode and a second electrode to which the same cell drive voltage is applied at the same time using different switching devices. The use of two switching devices enables the ultimate signal applied to each electrode to be different as a result of different capacitive effects.

In order to understand the invention, a discussion of the pixel circuit behaviour is first provided.

Figure 3:
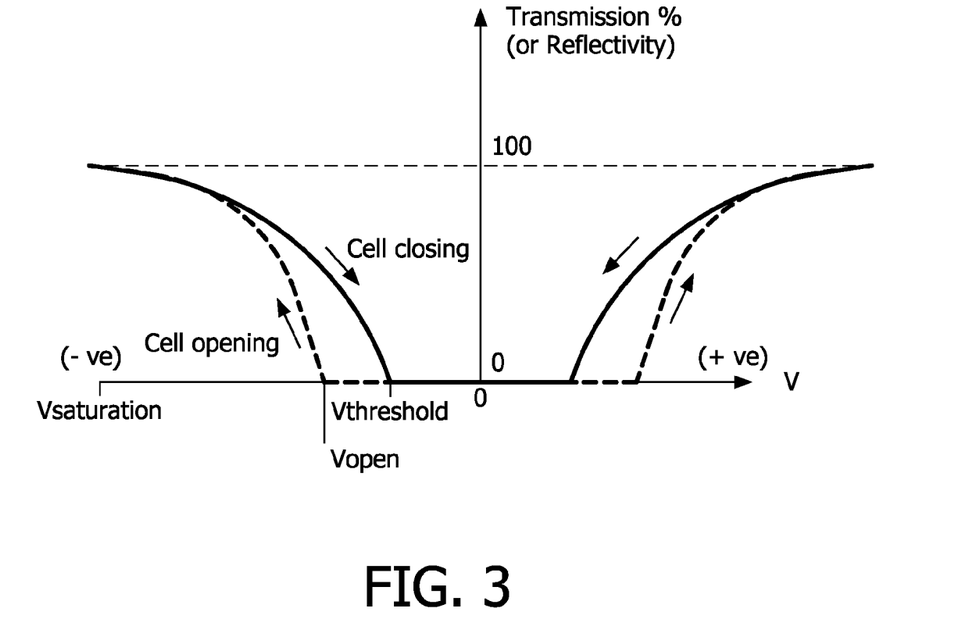
FIG. 3 shows the response of the pixel of FIGS. 1 and 2 to control voltages.

As explained above, modulation of the voltage between a pixel conductor and a common electrode conductor modulates the optical transmission state of a cell. This is shown schematically in FIG. 3, which shows that the cell opening is typically subject to hysteresis.

In order to put a greyscale value of transmission onto the cell, the cell must be opened fully first, and then closed to that particular transmission value. The cell may be designed for either reflective mode operation, with the light source coming from above (with respect to the orientation shown in FIG. 1), and in this case the pixel conductor is usually made from a reflective (typically metal) conductor. Alternatively the cell may be designed for a transmissive mode of operation, in which case the pixel conductor is usually made from a transparent (typically ITO) conductor. The light source can then be from below (with respect to the orientation shown in FIG. 1) with no reflector within the cell, or with the light source coming from above and using a reflector external to the cell below the substrate.

The invention has application to both transmissive and reflective mode displays, and the so-called transflective combination of the two modes.

The active matrix TFT has its gate terminal controlled by the row signal, and is used to address a particular pixel and to set the pixel electrode to the column voltage. When a pixel is addressed (i.e. selected), the gate turns on the TFT and connects the pixel electrode to the column voltage via the TFT channel. In the subsequent hold state, the TFT is turned off, and its channel presents a high resistance to the column voltage. A storage capacitor is used to hold the pixel voltage at the desired voltage level. Thus, a conventional active matrix concept can be used for electrowetting display cells.

This basic explanation ignores the well-understood effect of kickback, which acts to add an offset voltage onto the pixel electrode when the gate voltage returns to the off state. Essentially, it is caused by the capacitance between the row electrode and the pixel electrode (Cgs), which is therefore electrically in series with the net capacitance to ground of the pixel (Cpixnet). This capacitance therefore presents a voltage divider to the row signal. The magnitude of the kickback voltage is given by:

$$V_{kb} = V_a \cdot C_{gs}/(C_{gs}+C_{pixnet})$$ Equation 1

Figure 4:
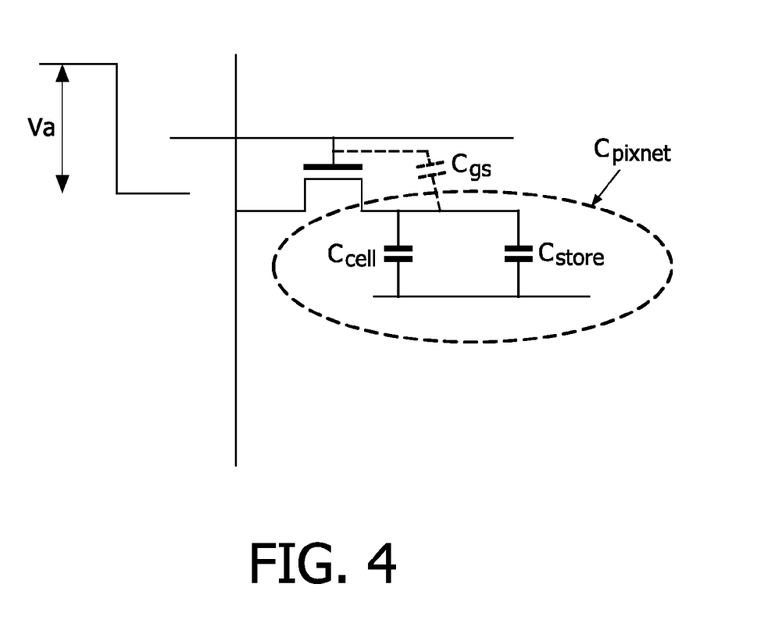
FIG. 4 is a circuit diagram of the pixel of FIGS. 1 and 2.

In Equation 1, Va is the peak to peak transition voltage of the gate pulse, and Cpixnet is the total capacitance between the pixel and ground potential and includes the storage capacitor and the capacitance of the electrowetting cell. These parameters are shown in FIG. 4 which represents a pixel circuit for one cell.

Figure 5:
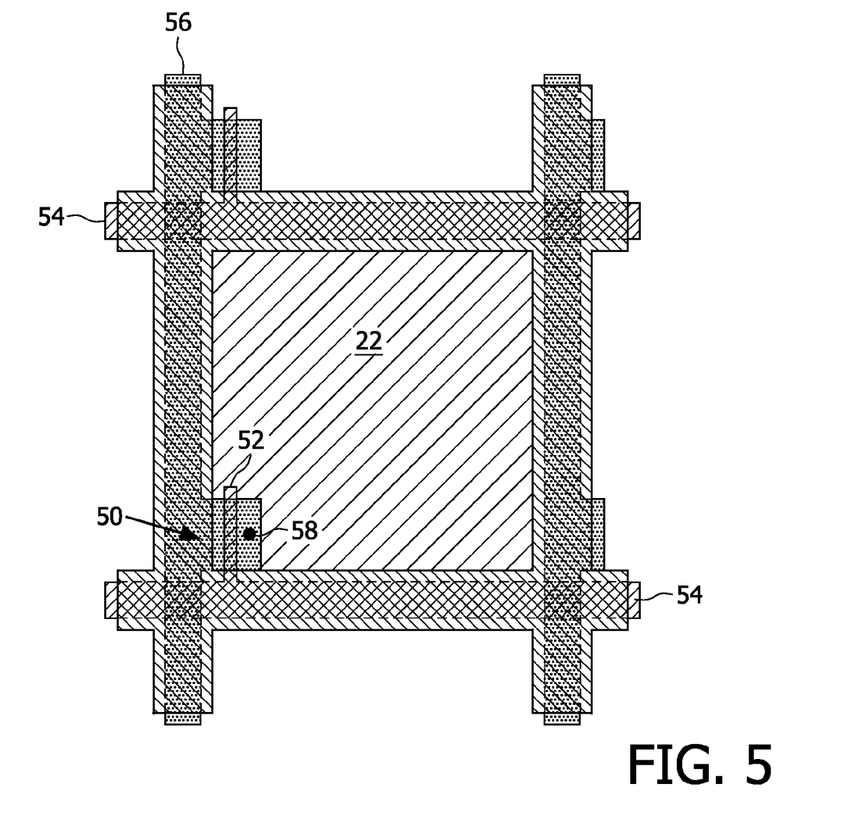
FIG. 5 shows a mask layout for the pixel of FIGS. 1 and 2.

FIG. 5 shows the known cell design in plan view, and shows the single TFT 50, the pixel electrode 22. In FIG. 5, the TFT 50 is placed on a spur 52 from the row conductor 54 which defines the gate, although it is also possible to place the TFT on the actual row conductor. The column conductor 56 connects to the TFT drain, and the source connects down to the pixel electrode 22 through a via 58. The storage capacitor is situated under the pixel electrode and is therefore not shown in FIG. 5.

Kickback is a well-known parasitic effect which the designer aims to minimise. This is achieved by increasing the value of the storage capacitor relative to the coupling capacitance between the row electrode and the pixel electrode (Cgs). Typically, for n-channel enhancement mode TFTs which are used in amorphous silicon TFTs, the gate voltage is positive to turn-on the TFT, and since the kickback voltage appears immediately after the TFT is turned off, Va is negative.

The kickback voltage Vkb is typically in the order of 1 to 2 volts.

This analysis of the effects of the kickback voltage is routine in the field of Liquid Crystal (LC) displays. Liquid crystal displays are usually operated with a frame inversion drive signal which inverts the polarity of the pixel voltage each frame. However, since the polarity of the kickback voltage is always the same, kickback in LC displays results in flicker. The effect of kickback is mitigated in Liquid Crystal AM displays by applying a fixed offset bias to the common electrode that is equal to the kickback voltage.

Electrowetting displays, on the other hand, are typically driven with a unipolar voltage due to parasitic charging effects within the stack of layers described above. In this case, the effect of kickback is not perceived as a great problem because the result is simply a shift in the cell transmission (or reflectivity) versus voltage curve (of FIG. 3) along the voltage axis.

The invention uses the kickback effect in order to control the oil movement within each cell. Thus, kickback is used in the method and apparatus of the invention to good effect.

Electrowetting cells tend to be opened by applying a negative voltage to the pixel electrode and connecting the common electrode to 0V. Therefore, in this setup, the typically negative kickback voltage acts to increase the cell opening. This is important because presently the high voltages required to open the electrowetting cells (typically −30V) put the display just outside the typical drive voltage capability of most commonly-available column driver IC's. Any additional increase in driver IC output voltage is undesirable.

Figure 6:
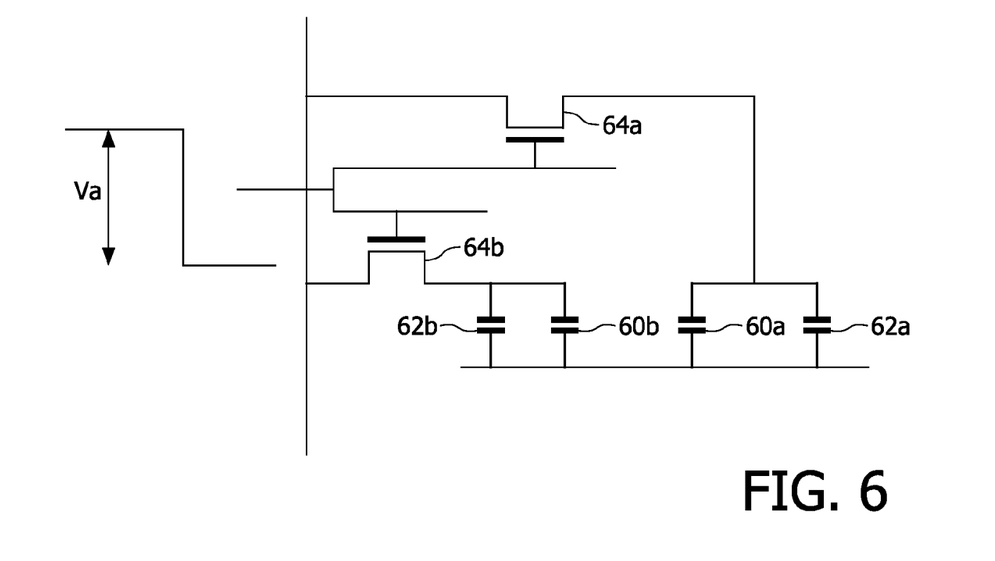
FIG. 6 is a circuit diagram of a pixel of a display device of the invention.

The pixel circuit of the invention is shown in FIG. 6, and comprises two pixel electrodes 60a, 60b, two storage capacitors 62a, 62b and two TFTs 64a, 64b within one pixel. The two TFTs are addressed using the same gate line and the data voltage on both pixels is set using the same column voltage line.

Figure 7:
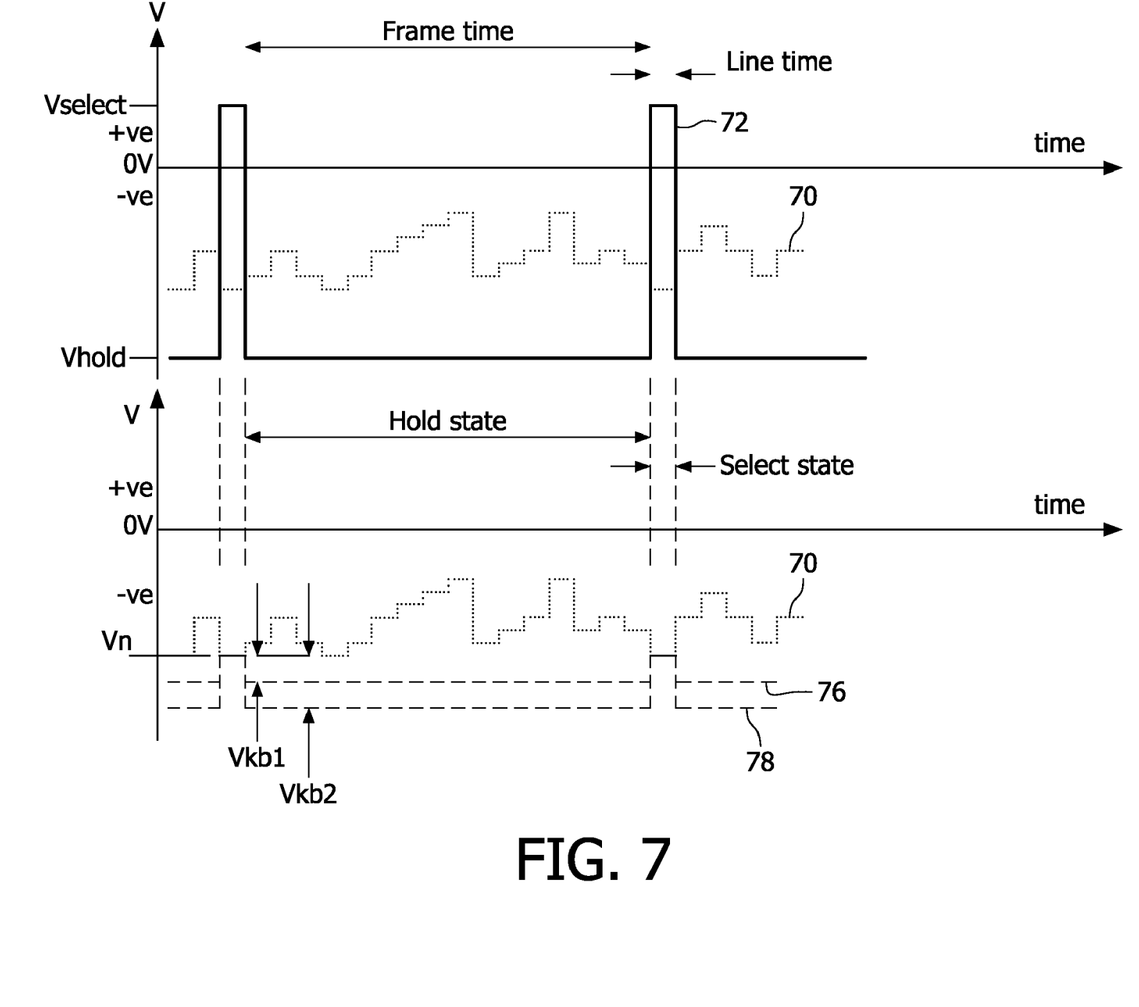
FIG. 7 is a timing diagram to explain the operation of the circuit of FIG. 6.

The voltages during the select and hold states are shown schematically in FIG. 7.

The top plot shows the column (data) voltage 70 and the row voltage 72 for a particular row of pixels. During the line time, the row voltage is pulsed high to turn on both addressing TFTs. During this time, the two pixel electrodes will be set to the same column voltage Vn which is present at that particular time.

The pixel electrode voltages for the two pixel electrodes are shown in the lower plot as 76 for the first pixel electrode and 78 for the second pixel electrode, for a particular pixel in the row. The column voltage waveform 70 is also repeated in the lower plot, to show that during the pixel addressing, the electrode voltages 76,78 are driven to the instantaneous column data voltage, shown as Vn.

The pixel circuit is designed such that there is a different value of kickback voltage for the two pixel electrodes. The kickback voltages are shown as Vkb1 and Vkb2, and this means that when the gate voltage returns to the 'off' state, (i.e. the hold state shown) there will be a different voltage on each of the two pixel electrodes.

This ensures that the when the oil film opens it moves away from the region where the higher magnitude pixel electrode voltage exists, in effect steering the oil away from this region and into the lower magnitude pixel electrode voltage.

In this way, control is provided over the electric field across the cell in two separate regions within the cell. One region is used primarily to cause the cell to open to a specific degree, and the other is used to steer the oil away from a particular region by applying a higher electric field here, so that the oil moves toward the lower field region.

For example, the region which steers the oil away can be located around an edge of the cell, but excluding a portion where the oil is to be driven.

From the kickback Equation 1 above, Va is the same for each TFT within the pixel as it is simply the peak to peak amplitude of the gate voltage. Typically Cgs<<Cpixnet, and the largest contributions to the total cell capacitance Cpixnet are usually the pixel storage capacitor (Cstore) and the pixel cell capacitance (Ccell), in which usually Cstore dominates Ccell.

Under these conditions, the kickback Equation 1 approximates for the two separate pixel electrodes to:

$$V_{kb1} = V_a \cdot C_{gs1}/C_{store1}$$ Equation 3

$$V_{kb2} = V_a \cdot C_{gs2}/C_{store2}$$ Equation 4

The different kickback voltages on the two pixel electrodes can be made to differ by altering the ratio Cgs/Cstore for the two pixel electrodes.

In order to change Cgs between the two cases, Cgs is the gate-source capacitance of the TFT, where the source is defined as the pixel electrode connection. Cgs is given by:

$$C_{gs} = \epsilon_0 \cdot \epsilon_{die1} \cdot A_{overlap}/t_{die1}$$ Equation 5 where $\epsilon_0$ is the permittivity of free space, $\epsilon_{die1}$ is the net permittivity of the TFT gate dielectric with a small contribution from the semiconductor material, $A_{overlap}$ is the overlap area of the source contact with the gate contact and $t_{die1}$ is the thickness of the gate dielectric with a small contribution from the semiconductor material. In some cell designs there will be an additional term included in Cgs due to the proximity of the row line to the pixel electrode, but the principle of changing Cgs remains the same. In practice, the easiest parameter to change within Cgs is usually $A_{overlap}$, which could be effected by slightly changing the size of the gate-source overlap area of one of the two TFTs. This could be effected by changing the TFT channel width or channel length dimensions, but can also be achieved by keeping the TFT dimensions the same for both TFTs and adjusting the area by which the gate and source contacts overlap in the mask design.

In practice, it is favourable for processing reasons to keep all TFTs identical within an array, which would then mean all TFTs have the same gate-source capacitance Cgs. In this case, the difference in kickback voltages would be achieved simply by changing the size of the storage capacitor (Cstore) which is situated under each of the two pixel electrodes within a cell in the usual way. Since the area available for use as a storage capacitor is typically proportional to the pixel electrode area, this gives a very simple design rule: keep both TFTs within each cell identical, but make the pixel electrodes and hence the storage capacitor with different areas. Assuming the storage capacitor value is made to be proportional to the pixel electrode area, the oil will be steered away from the smaller pixel electrode area since a smaller storage capacitor gives rise to a larger kickback voltage.

Many pixel electrode patterns can be designed to achieve this.

Figure 8:
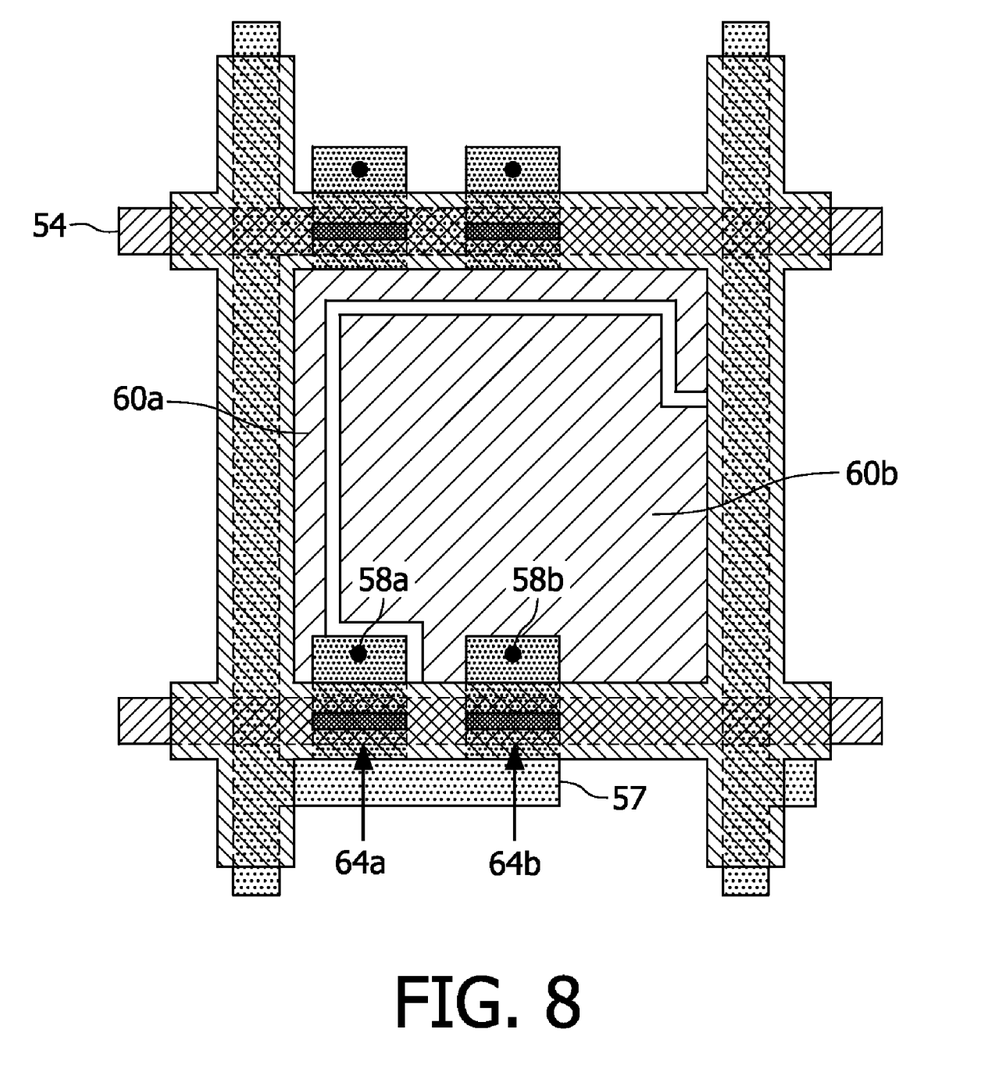
FIG. 8 shows a mask layout for the pixel of FIG. 6.

FIG. 8 shows one preferred implementation in which the first electrode 60a is defined as a thin strip of pixel metal surrounding the perimeter of a square pixel but excluding one corner. The pixel does not have to be square, but as long as this thin strip has the smaller proportion of pixel area, and a smaller storage capacitor, and the same size TFT (with the same gate-source capacitance Cgs) then the oil will be steered away from the three corners where the thin strip 60a exists and into the fourth corner.

In FIG. 8, the two TFTs are located on the actual row conductor 54, hence they share the same gate connection. The two TFTs share the same column connection to their drain, which is defined as a spur 57 from the column conductor 56. The TFTs could also be placed within the cell, but less cell aperture is obscured in transmissive designs by placing them on the row track and this minimises the slight reduction in display brightness. In reflective designs, the pixel electrode typically covers the TFTs in any case so there is no reduction in brightness as a result of using two TFTs.

The same argument justifies the two TFTs sharing the same column connection.

In FIG. 8 the two separate pixel electrodes are shown with the first 60a located around a large part of the cell's perimeter. This pixel electrode 60a is connected to the smaller storage capacitor of the two in the cell. This 'perimeter' electrode therefore has the larger kickback voltage of the two and when the cell is opened it pushes the oil towards the second electrode 60b, where it will 'bulge' up in the lower right hand corner when the cell is fully opened.

The electrode shapes shown in FIG. 8 are, however, only one example of possible design. The pixel electrode is shown shaded in FIG. 8. and is a reflective metal in a reflective design or a transparent conductor in a transmissive design.

The two storage capacitors (which are not shown in FIG. 8) are fabricated in the normal way and are situated below the pixel electrodes. These are planar capacitors made with either Indium Tin Oxide (ITO) or Aluminium plates. Essentially they are made by forming an overlap between the pixel electrode (or a metal layer connected to this) and a common storage capacitor track, and physically separating the two conductive layers with a storage capacitor dielectric layer. Variations on this theme are widely known to those in the field, and include the connection known as "Storage Capacitor on Gate" where the overlap is made between the pixel electrode and the gate track of pixels above or below.

Figure 9:
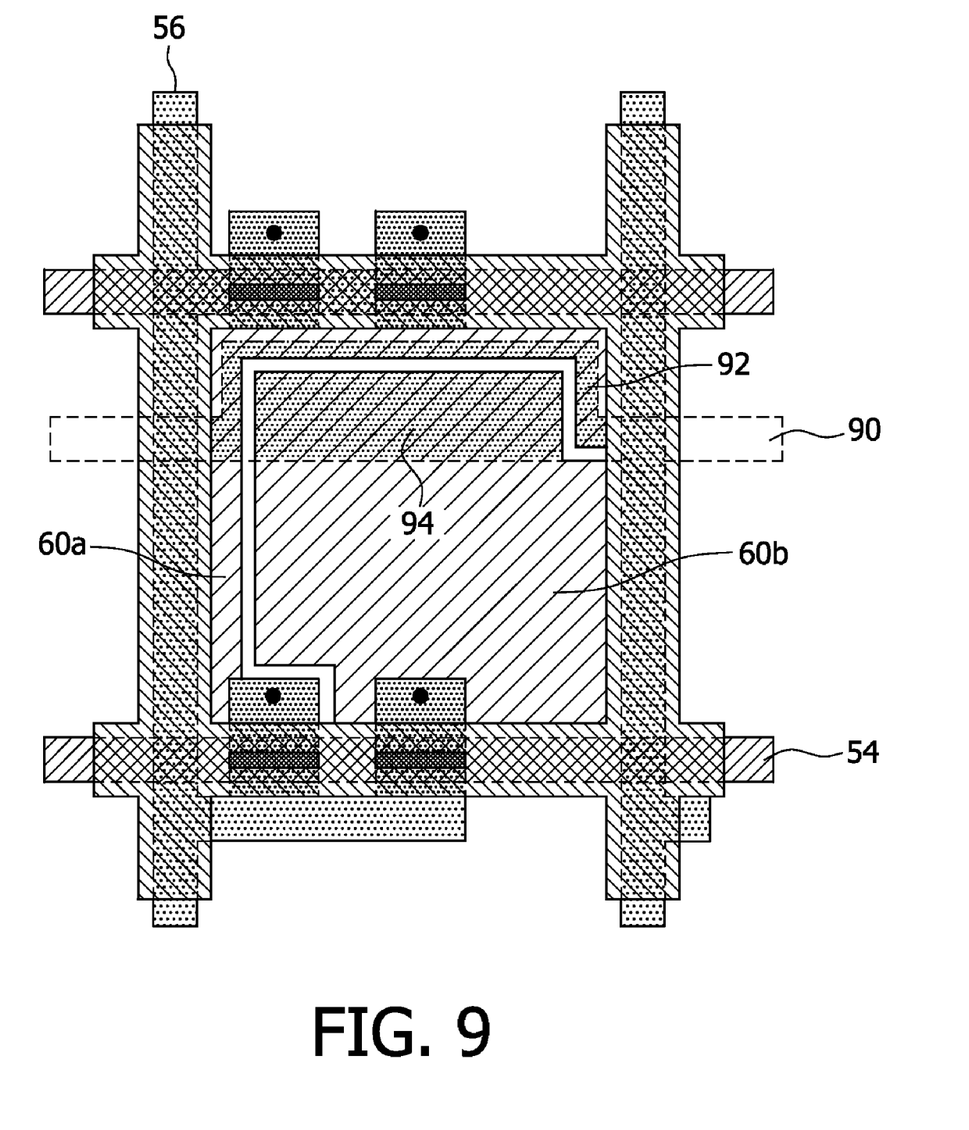
FIG. 9 shows the mask layout of FIG. 6 including the storage capacitor connections.

A plan view of one method of fabricating the storage capacitors is shown in FIG. 9. A storage capacitor common electrode 90 is provided as an array of conductors running in the row direction. The first pixel electrode 60a overlaps the common electrode 90 with a first area 92 defining a smaller capacitor area, and the second pixel electrode 60b overlaps the common electrode 90 with a second area 94 defining a larger capacitor area.

In the example shown, the total area of the pixel electrodes does not contribute to the storage capacitance, as is the case for example in transmissive cells, but again the layout is designed so that the kickback voltages in Equations 3 and 4 are different for the two pixel electrodes. This is achieved by making the storage capacitors with the same dielectric thickness but with different capacitor plate areas. The size of the storage capacitor must, of course, also satisfy the holding requirements of the cell's optical effect.

It would also be possible to vary the dielectric thickness between the two storage capacitors but this would require additional processing.

Alternative pixel electrode configurations and TFT configurations can also be used.

Figure 10:
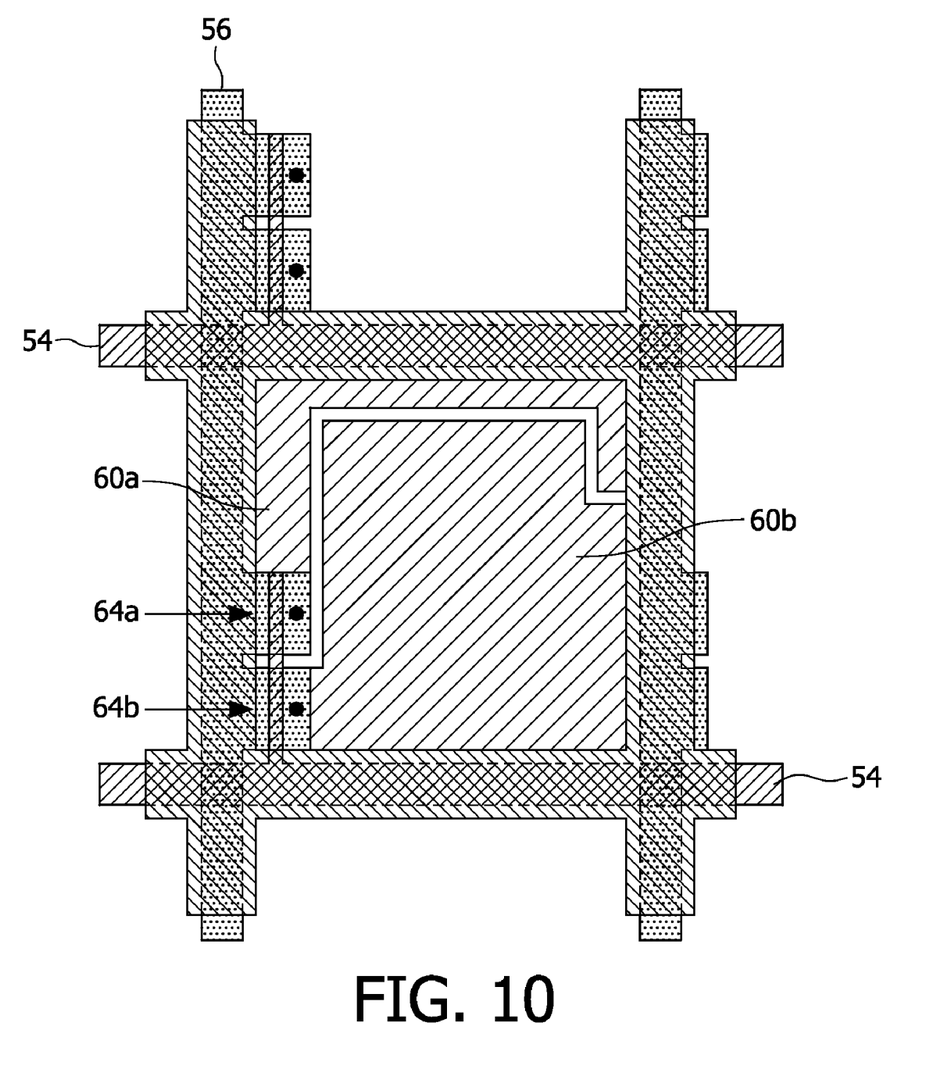
FIG. 10 shows a mask layout for a second example of pixel layout of the invention.

FIG. 10 shows a modification in which the TFTs are located close to the column electrode 56 and share the same gate spur from the row electrode 54 in order to minimise the cell area occupied by the connections to the TFT. Any area occupied by these non-transparent components acts to reduce display brightness in a transmissive display.

Figure 11:
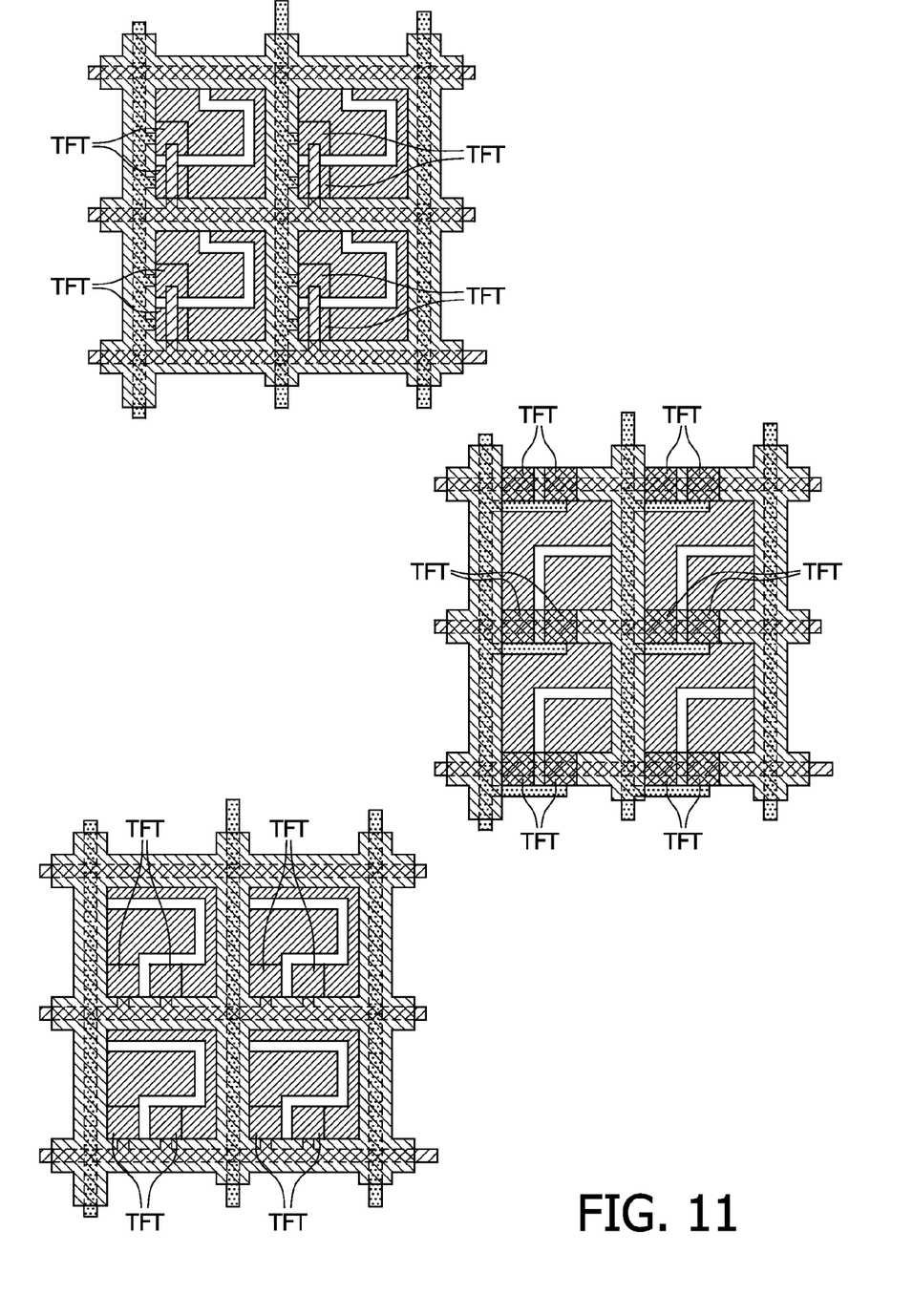
FIG. 11 shows schematically three further examples of electrode layout for pixel layouts of the invention.

FIG. 11 shows three further pixel electrode layouts which function in the same way as outlined above.

Figure 12:
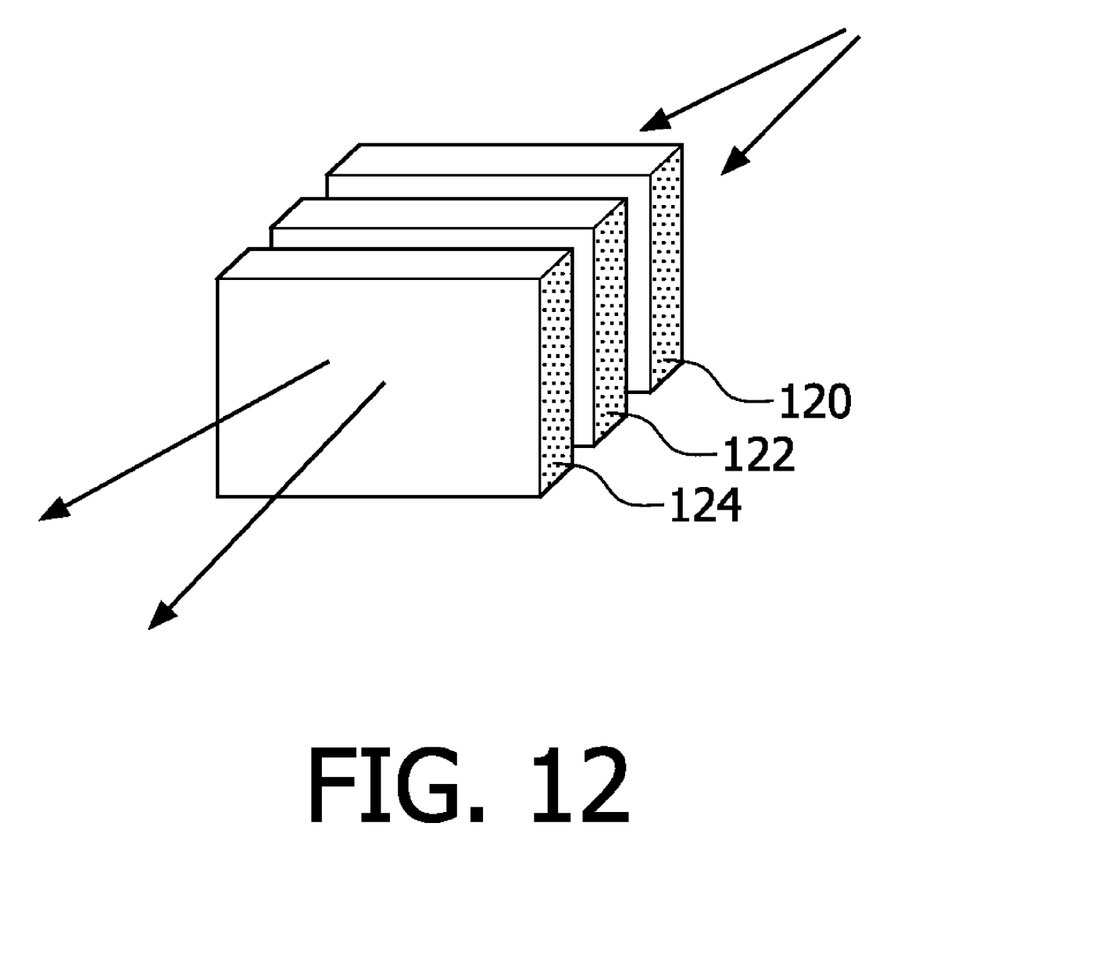
FIG. 12 shows a colour display device of the invention.

FIG. 12 shows a colour display device of the invention, including three separate display panels 120,122,124 stacked in an aligned manner, and with each display designed so that the oil layer collects at the same corner of the pixel cells, to provide improved colour output. One panel uses a cyan oil, one uses a magenta oil and the other uses a yellow oil.

The invention has been described with reference to examples of two TFTs connected to two electrodes within one pixel, but the concept can of course be applied to the control of the movement of the fluid interface by using more than two pixel electrodes within a pixel where applications require this.

The invention has been described in connection with a display device, but there may also be an application in the field of electrowetting lenses which also operate through the control of droplets of oil within a water reservoir.

The invention enables the use of a planar substrate, and this in turn can enable an Internal Diffuse Reflector (IDR) to be used to enhance the visual appearance.

The liquid materials used and the manufacturing processes have not been described in detail, as these are not altered by the invention, and these implementation details will be well known to those skilled in the art. The invention can be implemented by changing the electrode pattern and introducing a second pixel TFT using the same layers and processes that are required for the first pixel TFT.

Various other modifications will be apparent to those skilled in the art.

The invention claimed is:

1. An electronic device comprising an array of cells, each cell comprising:
   first and second liquids which are immiscible in each other;
   a hydrophobic layer;
   an electrode arrangement for applying a control voltage to the hydrophobic layer for controlling the position of the interface between the first and second liquids,
   wherein the electrode arrangement comprises a first electrode and a second electrode, wherein each cell comprises a first switching device for applying a cell drive voltage to the first electrode, and a second switching device for simultaneously applying the same cell drive voltage to the second electrode, and wherein each cell further comprises a first storage capacitance between the first electrode and a capacitor electrode, and a second storage capacitance between the second electrode and the capacitor electrode.

2. The device as claimed in claim 1, wherein the ratio of a parasitic capacitance of the first switching device to the first storage capacitance is different to the ratio of the corresponding parasitic capacitance of the second switching device (64b) to the second storage capacitance.

3. The device as claimed in claim 2, wherein each switching device comprises a thin film transistor, and the parasitic capacitance comprises the source-drain capacitance (Cgs).

4. The device as claimed in claim 3, wherein each transistor has substantially the same source-drain capacitance (Cgs) and the first storage capacitance is different to the second storage capacitance.

5. The device as claimed in claim 1, wherein the first electrode has a first area and the second electrode has a second, greater area.

6. The device as claimed in claim 1, wherein the cell has a substantially quadrilateral shape, bounded by cell walls, and wherein the first electrode comprises an outer electrode which borders three of the four sides of the quadrilateral, and the second electrode comprises an inner electrode which borders two adjacent sides of the quadrilateral at a corner location.

7. The device as claimed in claim 6, wherein the second electrode occupies a central region of the cell.

8. The device as claimed in claim 1, wherein the first and second electrodes are co-planar.

9. The device as claimed in claim 1, wherein the first liquid is water based and the second liquid is oil based.

10. The device as claimed in claim 1, comprising an array of rows and columns of cells, with row and column addressing conductors, wherein the switching devices of each cell are both connected to and switched by the same respective row conductor, and wherein the switching devices of each cell are both connected to the same respective column conductor for switching the column conductor voltage to the respective electrode of the electrode arrangement.

11. The device as claimed in claim 1, wherein a kickback voltage (Vkb1,Vkb2), introduced at the end of the addressing using the switching devices, is different for the two switching devices of each cell.

12. The device as claimed in claim 1, wherein each electrode is provided on the opposite side of the hydrophobic layer to the first and second liquids of the cell.

13. The device as claimed in claim 1, comprising a display device, wherein each cell comprises a display pixel.

14. The device as claimed in claim 13, wherein each cell comprises a clear liquid and a coloured liquid, the coloured liquid providing subtractive colour filtering.

15. The device as claimed in claim 14, comprising a stack of three display devices, one having cells with a magenta coloured liquid, one having cells with a cyan coloured liquid and one having cells with a yellow coloured liquid.

16. A method of operating an electronic device comprising an array of cells, each cell comprising first and second liquids which are immiscible in each other and a hydrophobic layer, the method comprising, for each cell:

applying a cell drive voltage to the hydrophobic layer for controlling the position of the interface between the first and second liquids using first and second electrodes, the same drive voltage being applied to the first and second electrodes simultaneously through respective switching devices, wherein each cell comprises a display pixel, and causing a kickback voltage to be introduced at the end of addressing using the switching devices, wherein the kickback voltage is different for the two switching devices of each cell.

* * * * *